United States Patent

[11] 3,568,797

[72] Inventor Willie R. Hardy
 P.O. Box 306, Tyhran Drive, Kathleen, Ga. 31047
[21] Appl. No. 815,112
[22] Filed Apr. 10, 1969
[45] Patented Mar. 9, 1971

[54] SPORTSMAN'S BASE
 5 Claims, 4 Drawing Figs.
[52] U.S. Cl. .................................................. 182/142, 248/221
[51] Int. Cl. ................................................. E04g 3/10
[50] Field of Search .................................... 182/142, 133, 189, 178; 248/221, 231, 321; 297/217, 274

[56] References Cited
UNITED STATES PATENTS
797,722   8/1905  Crandall ....................... 182/142
2,309,769  2/1943  Hubbard ....................... 248/231

FOREIGN PATENTS
1,341,538  9/1963  France ......................... 182/142
67,545     7/1892  Germany ....................... 182/187

Primary Examiner—Kenneth Downey
Attorney—Newton, Hopkins & Ormsby

ABSTRACT: A sportsman's base which includes a collapsible seat housed within a supportable frame. The supportable frame is attached to an adjustable and hand-cranked pulley system whereby once attached to a vertical structure the same may be raised or lowered at will. The attachment of the combination pulley system and support frame to the vertical structure includes a pivotally mounted and perpendicularly extending bar member which is connected to the channel of a plate member. The plate member includes teeth for digging into and fixedly attaching to the vertical structure. Additionally, a belt is connected to another bar member attached to the plate member and to the perpendicularly extending bar for providing added leverage to the gripping teeth. Initially, the plate member is hoisted to the desired level by the use of interfitted poles which fit within a similar pole connected to the channel of the plate member.

PATENTED MAR 9 1971

INVENTOR
WILLIE R. HARDY

BY Newton, Hopkins & Ormsby
ATTORNEYS

INVENTOR
WILLIE R. HARDY
BY Newton, Hopkins & Ormsby
ATTORNEYS

SPORTSMAN'S BASE

BACKGROUND OF THE INVENTION

This invention relates generally to a sportsman's base and more particularly to a sportsman's base with means for adjusting the height thereof.

In the past, one had to either stand or sit on the ground, or a large rock or on the limb of a tree while waiting for a desired game to appear. Such was not only uncomfortable, but could be extremely dangerous, due to the possibility of falling out of the tree or being attacked on the ground by wild game.

Others have tried to develop portable seats which were attachable to trees into which a sportsman could comfortably sit. While somewhat satisfactory, the prior art seats could only be placed near the bottom of the tree. As such the danger of being attacked by wild life was not overcome. Additionally, in the hunting of certain game it is extremely desirable to be at a higher level to enable a better angle of attack. Moreover, it is desirable to be capable of attaining a greater height for enabling the better viewing of a larger area.

SUMMARY OF THE INVENTION

Accordingly, one object of the present invention is the provision of a new and improved sportsman's base.

Another object of the present invention is to provide a new and improved sportsman's base for the hunting of wild game.

A further object of this invention is the provision of a new and improved sportman's base which is capable of being readily attached to a vertical structure at a high distance from the ground.

Still another object of the subject invention is to provide a new and improved sportsman's base which once attached to a vertical structure may be readily adjusted at will, to any desired height.

Another still further object of the instant invention is the provision of a new and improved sportsman's base which is both inexpensive and easy to construct.

Yet another object of the present invention is to provide a new and improved sportsman's base which is easily collapsed and thereby made portable.

One other object of the subject invention is the provision of a new and improved sportsman's base which is extremely comfortable and safe.

Briefly, in accordance with this invention, the foregoing and other objects are attained by hoisting an adjustable base structure a given distance from the ground and fixedly attaching the same to a vertical structure.

BRIEF DESCRIPTION OF THE DRAWINGS

A more complete appreciation of the invention will be readily apparent as the same becomes better understood by reference to the following detailed description when considered in connection with the accompanying drawings wherein.

DETAILED DESCRIPTION OF THE PREFERRED EMBODIMENT

Figure 1:
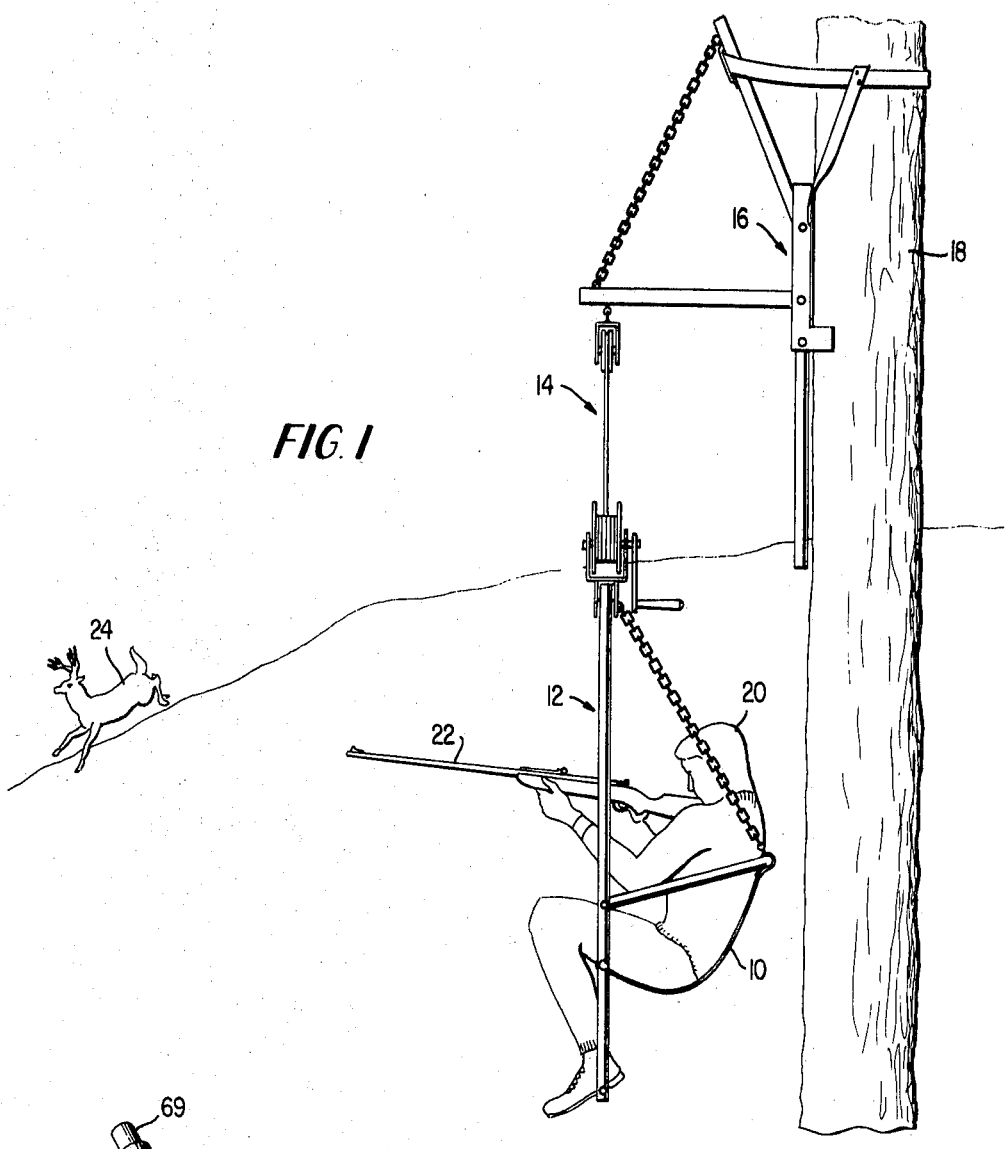
FIG. 1 illustrates a perspective view of an embodiment of the sportsman's base according to the present invention.

Referring now to the drawings wherein like reference numerals designate identical, or corresponding parts throughout the several views, and more particularly to FIG. 1 thereof wherein a sportsman's base in accordance with the present invention is shown as consisting essentially of a base structure 10 housed within a supportable frame 12 in combination with a hoisting system 14 and attaching means 16 for fixedly securing the housed base to a vertical structure, such for example, as the tree 18. A sportsman, such for example as a hunter 20, may then readily and comfortably position and seat himself at will. The hunter may then conveniently use a rifle, such as rifle 22, to locate and hunt game, such for example as the deer 24 shown in the FIG.

Figure 2:
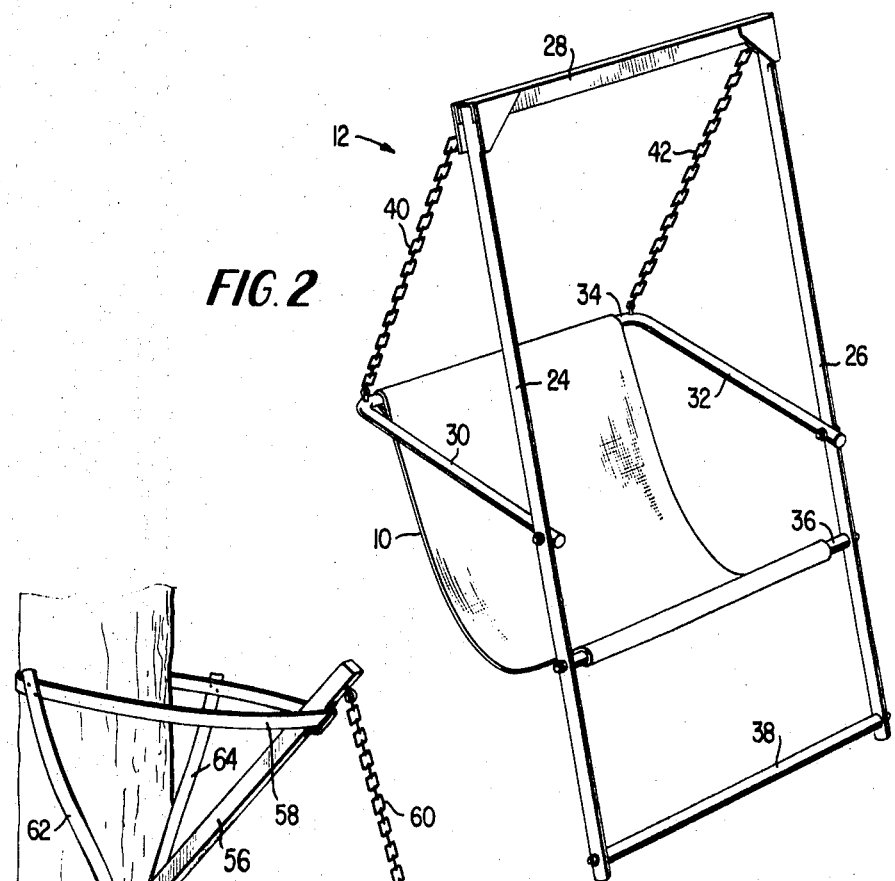
FIG. 2 illustrates a detailed perspective view of the base structure housed within a collapsible frame portion of the sportsman's base according to the present invention.

FIG. 2 illustrates in greater detail the base structure 10 which is housed within the supportable frame 12. The supportable frame 12 is shown as consisting of a first vertical bar element 24 and a second vertical bar element 26 between which is mounted the base structure 10. A first crossbar 28 is appropriately connected between the first vertical bar 24 and the second bar 26 for providing both a rigid structure and a means to which the pulley system, described in greater detail with reference to FIG. 3 below, is connected. Two pivotally mounted and outwardly extending bar members 30 and 32 are connected appropriately midway along the first vertical bar 24 and the second bar 26, respectively. A second crossbar 36 is connected between the first vertical bar 24 and the second vertical bar 26 to provide an attachment means for the base structure 10. A third crossbar 34 is connected between the first pivotally mounted bar 30 and the second pivotally mounted bar 32 for also providing a means to which the base structure 10 may be attached. It should be understood that crossbar 34 may be integrally connected with base members 30 and 32 to form a single U-shaped member or may be separately connected as described above. The base structure 10 is a seat made of any suitable material, such for example as cloth or the like, and the same may be secured to the two crossbar members 34 and 36 by overlapping the material around the bar members 34 and 36 by applying a seam thereto. Additionally, a fourth crossbar member 38 is connected between the first vertical bar 24 and the second vertical bar 26 for the purpose of giving added strength to the supportable frame 12 and for the primary purpose of acting as a footrest for the sportsman seated within the base structure 10. Chain members 40 and 42 are connected between the ends of the crossbar 28 and the crossbar 34 for allowing the housed support frame to be readily collapsed so that the same may be easily carried from place to place.

Figure 3:
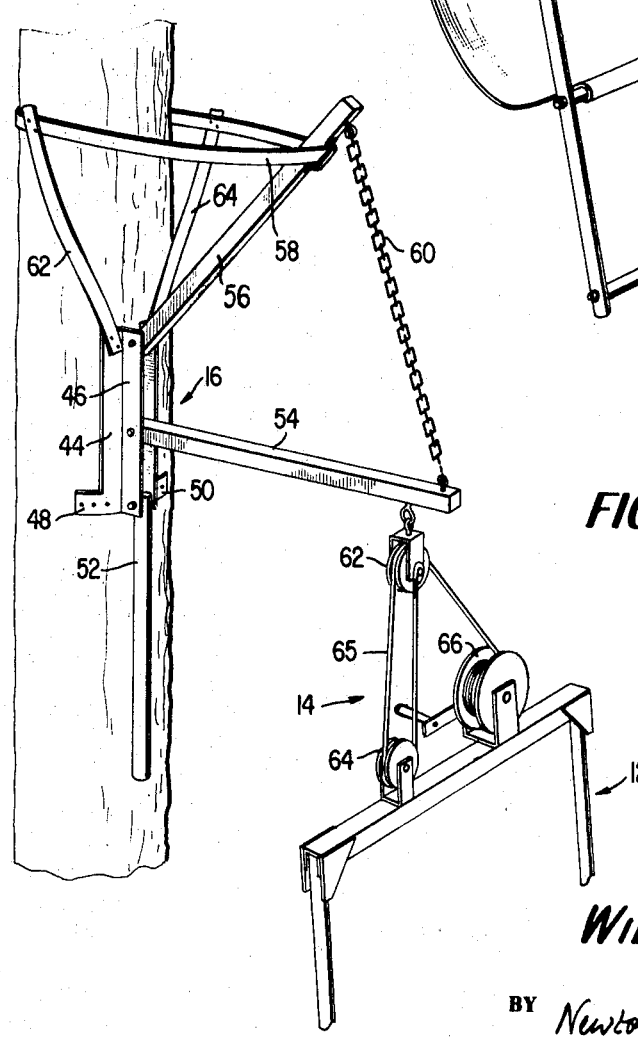
FIG. 3 illustrates in detail a perspective view of the manner for attaching to a vertical structure and for adjusting the level of the sportsman's base according to the present invention.

FIG. 3 illustrates in detail the attaching means for fixedly securing the housed supportable frame a given distance up a vertical structure. In particular, the attaching means 16 is shown as consisting of a plate member 44 which has a channel 46 therethrough. Teeth members 48 and 50 are attached to the base plate 44 for enabling the same to attach to a vertical structure by gripping thereto. The attaching section 16 is initially raised to the level desired by the use of pole members which interfit within a pole 52 that is attached to the channel 46 of the plate member 44, as more fully explained below in reference to FIG. 4. A first pivotally mounted bar member 54 extending substantially perpendicular to the plate member 44 is attached to the channel 46 thereof. The bar member 54 is used to support the housed frame structure 12. A second pivotally mounted bar member 56 is attached to the channel 46 of the plate member 44 enabling a belt member 58 to be attached around the vertical structures and the bar member 56 for supporting the same. Additionally, the end of the bar member 56 is connected to the end of the bar member 54, such for example by the use of a chain element 60, whereby added leverage is applied to the gripping teeth members 48 and 50. Furthermore, two belt sections 62 and 64 are connected to the plate member 44 and to the belt member 58 for added support.

Also, as shown in FIG. 3, a pulley system is provided between the supporting bar member 54 and the housed base structure 12 for enabling the housed base structure to be raised or lowered by a sportsman seated therein to any desired level. The pulley system includes wheels 62 and 64 to which a suitable cord or chain 65 is wrapped therearound and connected to a hand-cranking reel 66 for tightening or releasing the cord or chain 65 whereby the housed base structure 12 may be readily raised or lowered.

Figure 4:
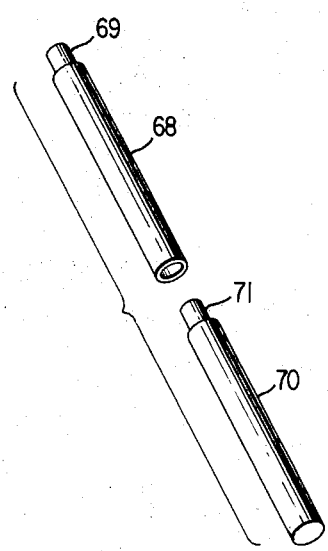
FIG. 4 illustrates interfitted poles which may be used in hoisting the sportsman's base of the present invention.

Referring now to FIG. 4, two pole sections 68 and 70 which are used for hoisting the attaching plate member 16 up the tree are therein disclosed. The pole members are shown as having respective tapered portions 69 and 71 wherein one pole may be readily interfitted within the other pole to give a pole of added length. Initially, a first pole, such as pole 68, is inserted within the pole member 52, shown in FIG. 3, and the attaching means 16 is raised to a particular level. If a greater height is desired, another pole section, such for example as the pole section 70, may be interfitted within the pole member 68 to raise the attaching means 16 still further up the vertical structure to which the same is attached.

It should now be readily apparent that the herein described invention discloses a sportsman's base structure which is not only inexpensive and easy to construct, but is both comfortable and has great flexibility in allowing a sportsman to raise himself to any desired level along a vertical structure. It should be understood, however, that while the invention has been described with particular reference to a hunter seated within the housed base structure, that it is not so limited and that a similar structure could be used with a platform whereby one could stand within the housed frame for any purpose, such as sightseeing or surveying. Likewise, while the invention has been described with reference to the use of two hoisting poles, any number of such interfitted pole elements or the like may readily be used to hoist the attachable plate member according to the subject invention.

Obviously, many modifications and variations of the present invention are possible in light of the above teachings. It is therefore understood, that within the scope of the teachings herein and the appended claims the invention may be practiced otherwise than as specifically described.

I claim:

1. A sportsman's base comprising a supporting means adapted to be secured at a selected position to a vertical structure, a rectangular frame having side and end members, a reel mounted on one of said end members and having a hand crank for rotating the reel, a cord attached at one end to said supporting means and having its other end passed around and attached to said reel, whereby rotation of the reel will cause the cord to be wound on the reel and to draw the frame toward the supporting means, a crossbar joining the side members of the frame and parallel to the end members thereof, a U-shaped bar pivotally secured at its ends to the respective side members of the frame at points equally spaced from said crossbar, flexible connections between the bent portions of the U-shaped bar, respectively, and two corners of the frame at opposite ends of an end member, such connections being of such length that the U-shaped member may be supported in a position substantially at right angles to the frame and a flexible seat secured at one end to the crossbar and at the other end to the base of the U-shaped member.

2. A device as in claim 1 wherein a pulley is provided on the supporting means and a second pulley is provided on the same frame end as the reel, and wherein the cord passes over the said pulleys.

3. A device as in claim 1 wherein the supporting means is adapted to be secured in position on a tree and comprises a band at its upper end adapted to loosely encircle a tree, and teeth at its lower end adapted to bite into the tree, and wherein the supporting means also includes an arm extending outwardly from the tree engaging portion at a point intermediate the ends thereof, and the cord is secured at the outer end of the arm, whereby the weight of the supporting frame and a person seated thereon will tend to tilt the supporting means and to cause the teeth to engage the tree more firmly.

4. A device as in claim 3 wherein the supporting means includes a hollow pole member adapted to receive the end of a pole and wherein a sectional pole is provided for engaging said pole member for elevating the supporting means to its selected position.

5. A device as in claim 1 wherein said supporting means is adapted to engage a tree and comprises a channel member adapted to be placed vertically along the trunk of a tree with the channel opening outwardly, and wherein teeth are provided at the lower end of said channel member and are adapted to bite into the tree, and wherein said supporting means further includes a band adapted to loosely encircle a tree at a point above the upper end of said channel member, and two belt sections connected to said band and said channel member for supporting said band above said member, said supporting means also including a bar member pivoted at the upper end of said channel member and adapted to extend upwardly along the tree trunk within said band and to pivot outwardly to an inclined position in which it rests against said band, and wherein said supporting means further includes a second bar pivoted to the channel section intermediate the ends thereof, and a flexible connection is provided between the outer ends of said rods, and wherein the said cord is connected to the outer end of said second bar.